United States Patent [19]

Thiboutot

[11] Patent Number: 4,771,163

[45] Date of Patent: Sep. 13, 1988

[54] BAKING OVEN

[75] Inventor: Réal Thiboutot, Laval, Canada

[73] Assignee: Brute Kitchen Equipment Company Inc., Montreal, Canada

[21] Appl. No.: 61,659

[22] Filed: Jun. 15, 1987

[51] Int. Cl.⁴ ............................. A21B 1/26; F27D 7/04
[52] U.S. Cl. ...................................... 219/400; 219/401; 126/21 A
[58] Field of Search .................. 219/400, 401; 34/225; 126/21 A, 21 R; 415/211, 206

[56] References Cited

U.S. PATENT DOCUMENTS

| | | | |
|---|---|---|---|
| 1,996,680 | 4/1935 | Lobley | 219/400 |
| 3,006,603 | 10/1961 | Caruso | 415/211 |
| 3,077,530 | 2/1963 | Chase et al. | 219/401 |
| 3,873,231 | 3/1975 | Callahan | 415/211 |
| 4,094,631 | 6/1978 | Grieve | 34/225 |
| 4,687,908 | 8/1987 | Thorne | 219/400 |
| 4,701,334 | 10/1987 | Durth | 219/401 |

FOREIGN PATENT DOCUMENTS

| | | |
|---|---|---|
| 1199229 | 1/1986 | Canada . |
| 0086421 | 8/1983 | European Pat. Off. ............ 219/400 |
| 0152571 | 8/1985 | European Pat. Off. .......... 126/21 A |
| 3116171 | 11/1982 | Fed. Rep. of Germany ... 126/21 A |
| 2731191 | 3/1983 | Fed. Rep. of Germany . |

Primary Examiner—E. A. Goldberg
Assistant Examiner—Teresa J. Walberg
Attorney, Agent, or Firm—Foley & Lardner, Schwartz, Jeffery, Schwaab, Mack, Blumenthal & Evans

[57] ABSTRACT

A baking oven has a housing formed by a back wall and by circumscribing walls. It is divided into an air heating -and- propelling room and a baking compartment by a vertical wall parallel to the back wall. The rear wall has a central air suction opening for an air fan located in the aforesaid room, the latter further containing heating coils for heating the air propelled by the fan. The rear wall edges terminate short of the housing circumscribing walls so as to define a peripheral air outlet passage; the fan thus creating an annulus-like hot air current in the baking compartment, between the air outlet passage and the suction opening for baking dough products in the baking compartment. An air diffusing ring is provided in the aforesaid room about the fan; the ring being a perforated band of which the width is about equal to the distance between the back and rear walls. Air guiding flanges are formed along the edges of the vertical rear wall, being turned toward the baking compartment.

14 Claims, 5 Drawing Sheets

BAKING OVEN

BACKGROUND OF THE INVENTION

1. Field of the Invention

The present invention relates to a baking oven and is more particularly concerned with an improved manner of controlling the hot air current circulation in the baking compartment to ensure a more uniform baking of dough products.

2. Description of the Prior Art

The baking oven, to which the inventive improvements herein are applied, is of the type having a housing formed by a back wall and by circumscribing walls joining the back wall at one end and having an access door structure at the other end. The housing is divided into an air heating-and-propelling room and a baking compartment by a vertical rear wall parallel to the back wall. The rear wall has a central air suction opening for an air fan located into the room, the latter further containing heating coils for heating the air propelled by the air fan. The edges of the rear wall terminate short of the housing circumscribing walls so as to define therewith a peripheral air outlet passage; the fan thus creating an annulus-like hot air current in the baking compartment, between the air outlet passage and the suction opening, for baking dough products in the baking compartment. A baking oven of this type is to be found in Canadian Pat. No. 1,199,229 of Jan. 14, 1986, which includes both a proofer compartment and a baking compartment; the present invention being concerned only with the baking oven per se, that is the baking compartment.

In a baking oven of the type described above, the rear wall behind which the air is centrally mounted is rectangular, so that, with the fan ejecting air in a circular array, the flow of air (volume per unit of time) is uneven along the rectangular air outlet passage. Also, the air ejected into the baking compartment by the sections of the air outlet passage located closer to the fan, is sucked in by the fan faster than the air ejected through the remaining sections. This causes a disturbance in the air current in the baking compartment resulting in an uneven baking of the dough products. A major object of the invention therefore lies in improvements tending to lessen the aforementioned disturbance in the air current caused by the rectangular shape of the rear wall in conjunction with the circular radial path of the air from the fan.

SUMMARY OF THE INVENTION

The object is achieved, according to the invention, by fixing an air diffusing ring about the fan, in the air heating-and-propelling room; the ring being in the shape of a circular strip, having a width about equal to the distance between the back wall and the rear wall, and being pierced with air perforations distributed along its length. The combined shape, size and location of these perforations are selected to allow an essentially even air flow through the air passage. Concurrently, air guiding flanges are provided along the edges of the rear wall, which flanges are turned toward the baking compartment.

According to a preferred form, the air perforations are rectangular, are equally spaced around the ring, have an equal length and have a width, along the ring, increasing from the polar axis of the ring toward its equatorial axis.

In another form, the air perforations are equal in size and shape but increase in number from the polar axis of the ring toward its equatorial axis.

As to the air guiding flanges, there may be one pair of straight lateral flanges along the vertical edges and perpendicular to the rear wall and a pair of angular flanges along the horizontal top and bottom edges of the rear wall; the horizontal wings of the latter being perpendicular to the rear wall while the vertical wings project in a direction away from the rear wall.

Other features and advantages of the invention will become apparent from the following description of a preferred embodiment having reference to the appended drawings.

DESCRIPTION OF THE PREFERRED EMBODIMENT

Figure 1:
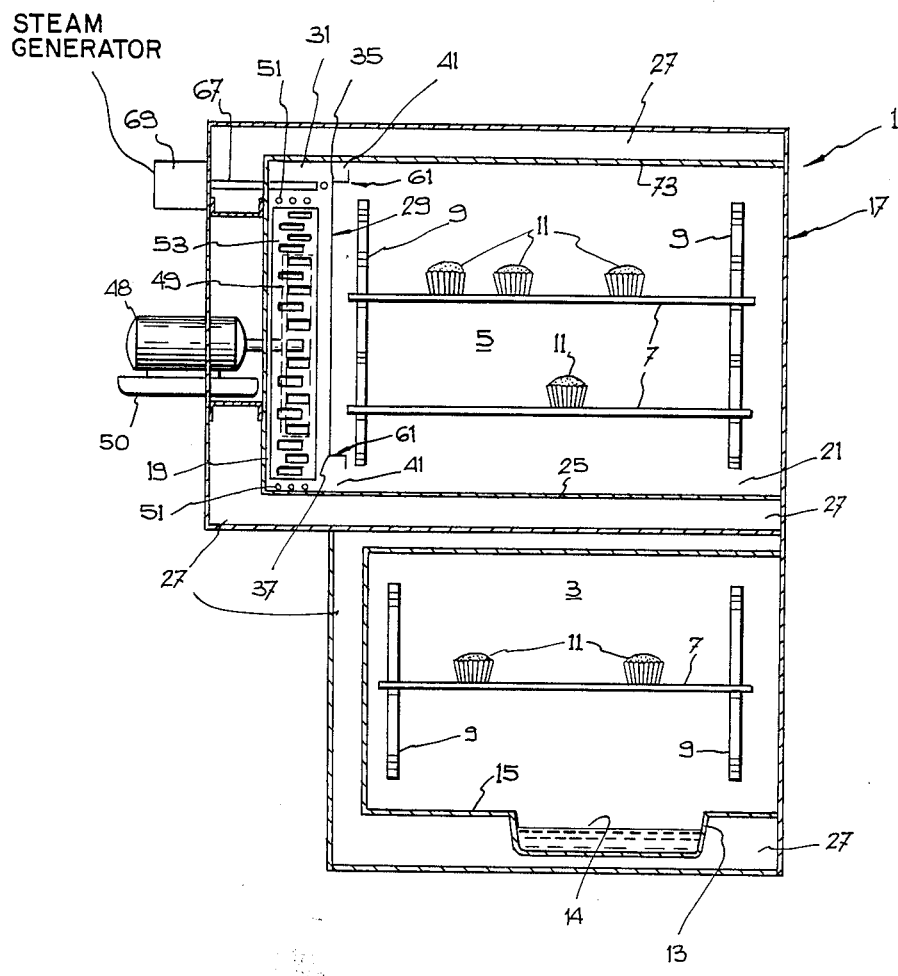
FIG. 1 is a diagrammatic side view of a baking oven incorporating the improvements according to the invention.
Figure 2:
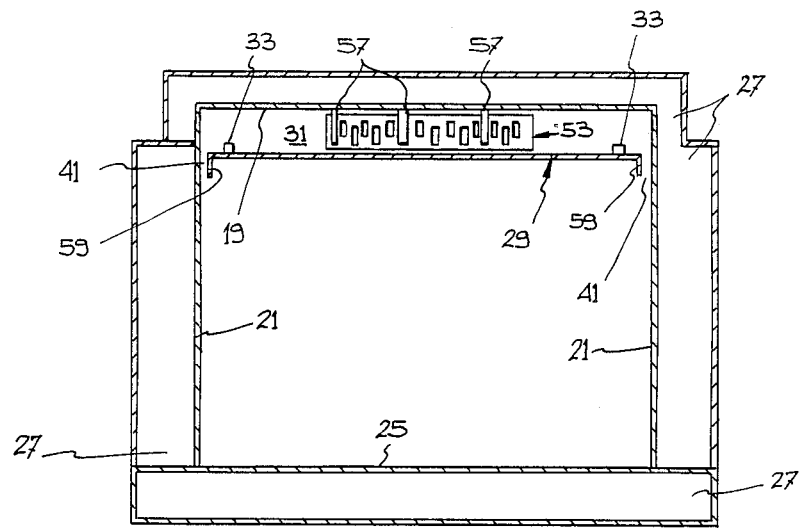
FIG. 2 is a diagrammatic top view and FIG. 3 is a diagrammatic front view of the oven of FIG. 1.
Figure 3:
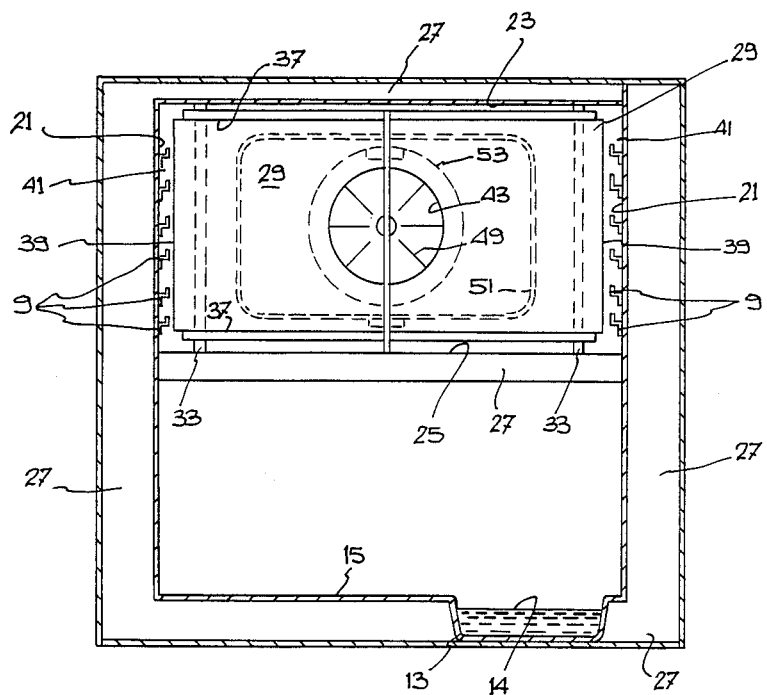

Referring to FIGS. 1, 2 and 3, the baking oven 1 incorporating the novel features of the present invention comprises a lower proofer compartment 3 and an upper baking compartment 5. Both compartments are provided, at the right in FIG. 1, with door means (not shown) providing access to them for the placing of containers 11 on shelves 7 mounted on side wall brackets 9, in conventional manner. The proofer compartment 3 is used for causing the dough in containers 11, to rise prior to placing them in the baking compartment 5. This proofer compartment is of no concern here since the improvements, according to the invention, are to be found in the baking compartment 5. It may however be of interest to point out that the dough is first made to rise by a hot air current circulating in the compartment 3 and absorbing moisture generated from water 14 in a tray 13 at the bottom 15 of the compartment 3.

The baking oven proper has a housing 17, of rectangular cross section, formed by a back wall 19, sidewalls 21, top wall 23 and bottom wall 25; walls 21, 23 and 25 constituting circumscribing walls joining the back wall 19 and the not shown door means at the opposite end of the baking compartment 5. Housing 17 of the baking compartment 5 as well as the housing the proofer compartment 3 are covered, except for the door means, with a conventional heat insulating jacket 27 of which the specific construction need not be given here.

Mounted within the housing 17, in space parallel relationship with the back wall 19, is a vertical rear rectangular wall 29 dividing the housing into a rear air heating-and-propelling room 31 and the aforesaid front baking compartment 5. The rear wall 29 may be fixed to the circumscribing walls in any known manner such as by brackets 33 (FIGS. 3 and 8) solid with it and secured to the top and bottom walls 23, 25. It will be noted that the horizontal top and bottom edges 35, 37, and the vertical lateral edges 39 of the rear wall 29 terminate short of the circumscribing walls 21, 23, 25, and define, with them, a peripheral air outlet passage 41.

Figure 8:
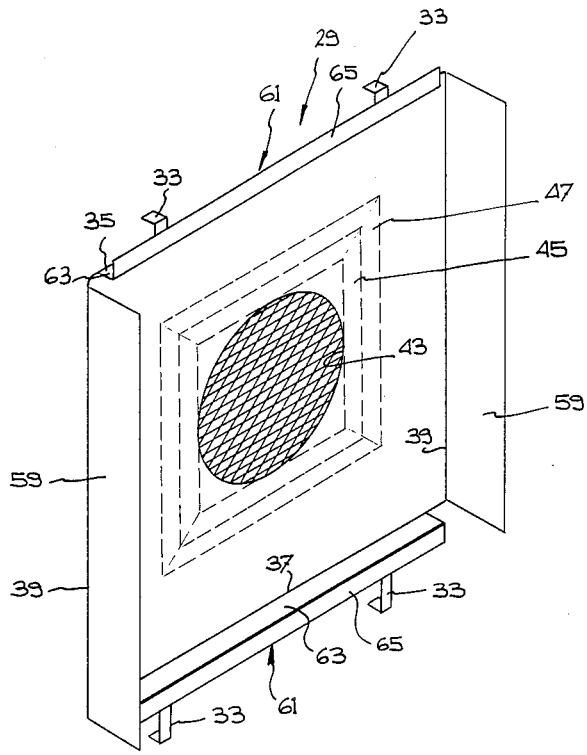
FIG. 8 is a perspective view of the rear wall assembly.
Figure 5:
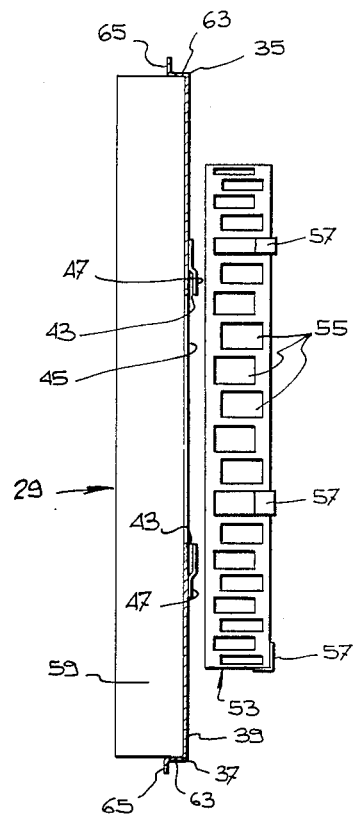
FIGS. 4 and 5 are, respectively, a diagrammatic top and a diagrammatic side view of the rear wall and of an air diffusing ring, made according to the invention.
Figure 4:
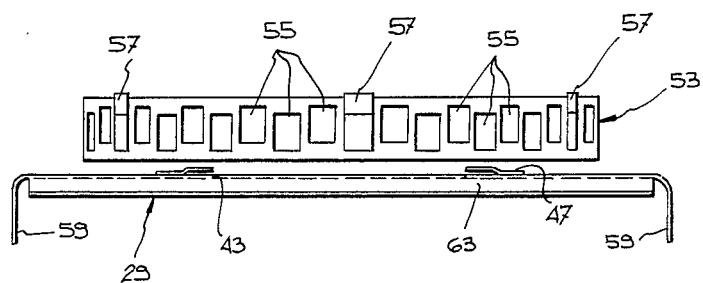

The rear wall 29 further has a central air suction opening 43, best seen in FIG. 8, covered with a square meshing 45 held in place by any suitable means such as by a frame bracket 47. The meshing 45 serves to prevent access, by foreign objects to an impeller air fan 49 suitable positioned in the room 31 for drawing air through the suction opening 43 and for expelling it into the baking compartment 5 across the peripheral air flow passage 41. The motor 48 of the fan 49 may be borne by a support 50 solid with the structure of the jacket 27.

Heating means, in the form of three heating coils 51 are provided in the room 31 for heating air expelled by the air fan 49.

With the above described construction, known from Canadian Pat. No. 1,199,229, and annulus-like hot air current is created in the baking compartment between the peripheral air outlet passage 41 and the suction opening 43, when the air fan 49 is operated, for baking dough products. The motor 48 preferably has a reverse drive cycle to allow operating the fan 49 alternatively in opposite directions; the cycle being repeated several times during the baking process.

As mentioned previously, one feature of the invention is the provision of an air diffusing ring 53 fixed in the air heating-and-propelling room 31 about the air fan 49. Ring 53 has the shape of a rigid circular strip, preferably metallic, of which the width is about equal to the distance between the back wall 19 and the rear wall 29; the strip being formed with air perforations 55 distributed along its length, the combined size, shape and location of the perforations 55 being selected to allow an essentially even flow through the air flow passage 41.

Figure 7:
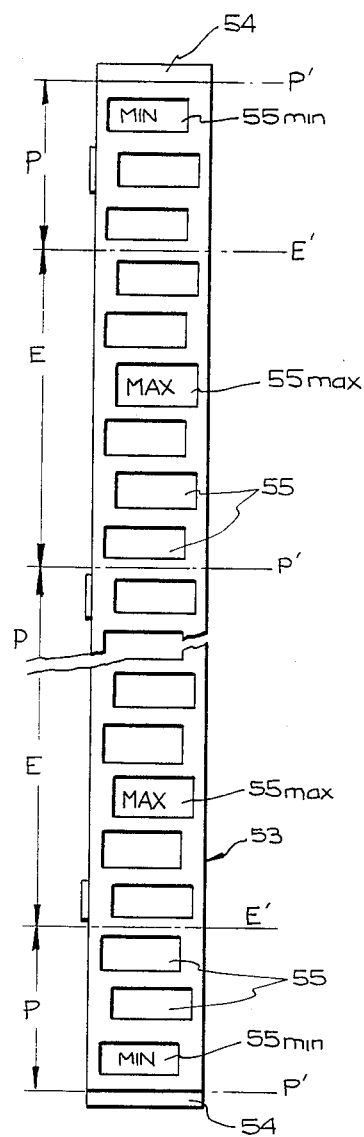
FIG. 7 (first sheet of drawing) is a developed view of the air diffusing ring of FIG. 6.
Figure 6:
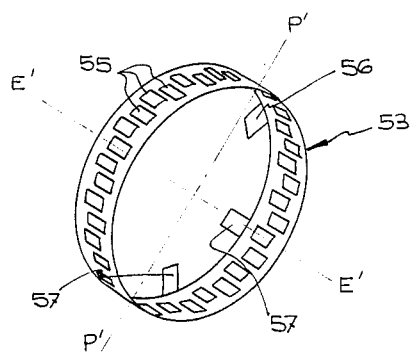
FIG. 6 (first sheet of drawing) is a perspective veiw of the air diffusing ring.
Figure 7A:
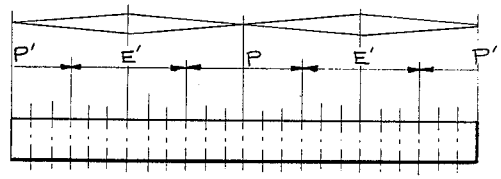
FIG. 7a is a diagram illustrating the arrangement of the air perforations, in one particular form of the diffusing ring.

Thus, as shown in FIGS. 7 and 7a, the air perforations 55 (only their longitudinal center lines being shown in FIG. 7a) are rectangular, are equally spaced around the ring 53, have the same length but have a width, measured in the length of the ring, that increases from the polar axis $P^1$—$P^1$ to the equatorial axis $E^1$—$E^1$; the former being perpendicular to the horizontal top and bottom edges 35, 37, of the rear wall 29 while the latter is perpendicular to the lateral vertical edges 39. The top of FIG. 7a shows the situation where the variation in width is gradual, that is, linear; but this need not necessarily be so as the variation will depend on the distances, along extended radii of the ring 53, between corresponding points on the ring and on the peripheral edges 35, 37 and 39 of the rear wall 29. In this case, the largest perforations are 55 max., in FIG. 7, and the smallest 55 min.

Figure 9:
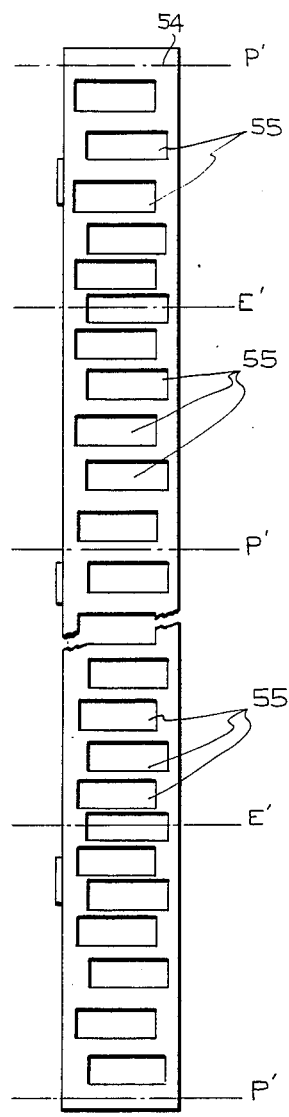
FIG. 9 is a diagrammatic view illustrating the arrangement of the air perforations in another embodiment of the diffusing ring.

According to another embodiment shown in FIG. 9, the rectangular air perforations 55 may be equal in size and shape but increase in number from the polar axis $P^1$—$P^1$ toward the equatorial axis $E^1$—$E^1$.

The purpose in all cases is to allow a larger outflow of air in the equatorial zones E of the rings 53 (FIG. 7) than in the polar zones P which are closer to the horizontal top and bottom edges 35, 37, and thus closer to the air outlet passage 41. In this manner, it is possible to alleviate the problem of air disturbances in the baking compartment 5 by providing a more even flow of air along the peripheral passage 41.

The metal strip forming the ring 53 may have any convenient means at the ends thereof, such as lands 54, that may overlap and be joined together to form the strip into the required ring.

The air diffusing ring 53 may be fixed in room 31 in any conventional manner as by means of right angled brackets 56 of which one tab may be welded to the ring 53 while the other tab may be secured, as by bolting or welding, to the back wall 19.

Another feature of the invention is in the presence of air guiding flanges 59, 61, (FIG. 8) formed along the edges 35, 37 and 39 of the rear wall 29; being turned toward the baking compartment 5 as shown in FIGS. 1 and 2.

In this respect, there is preferably provided a pair of straight lateral and vertical air guiding flanges 59, projecting at right angle into the baking compartment 5 as well as a pair of angular horizontal flanges 61 projecting into the compartment 5 from the upper and lower horizontal edges 35, 37, of the rear wall 29. Each angular flange 61 may have a horizontal wing 63, projecting perpendicularly from the respective horizontal edge, and a vertical wing 65, projecting perpendicularly from the free edge of the horizontal wing 63 in a direction away from the rear wall 29.

According to a preferred form, each horizontal wing 63 has a depth equal to about ¼ that of the lateral flanges 59.

Additionally, referring to FIG. 1, the upper horizontal edge 35, of the rear wall 29, stands advantageously at a distance from the top wall 23, of the compartment 5, equal to about ¼ of the distance between the lower horizontal edge 37 and the bottom wall 25.

The purpose of the flanges 59, 61, is to have the air cling to the circumscribing walls of the oven on as long a distance as possible before being deflected toward the suction opening 43.

Whenever it is desired to glaze the surface of the baked dough, at the end of the baking cycle, moisture is added to the air in the air heating-and-propelling room 31. This may advantageously be done by adding steam to the room through a steam delivery pipe 67 of a steam generator 69 (FIG. 1); the latter being mounted outwardly of the baking oven 1 while its delivery pipe extends through the insulating jacket 27 and into the room 31, above the air diffusing ring 53 and the heating coils 51.

The embodiments of the invention in which an exclusive property or privilege is claimed, are defined as follows:

1. A baking oven having a rectangular housing formed by a back wall, by circumscribing walls joining said back wall and by door means connected to said circumscribing walls at the ends thereof away from said back wall; a vertical rectangular rear wall, in said housing, positioned in spaced parallel relationship with said back wall and dividing said housing into a rear air heating-and-propelling room and a front baking compartment, said rear wall having edges terminating short of said circumscribing walls whereby to define therewith a peripheral air passage, said rear wall further having a central air suction opening; an air fan, in said room, positioned therein for drawing air through said section opening and for expelling said air into said baking compartment from across said room and air passage; and heating means about said fan, thereby to create an annulus-like hot air current in said baking compartment between said air passage and said suction opening for baking dough products in said baking compartment, the improvement in the combination therewith comprising:
- an air diffusing ring fixed in said room about said fan, said ring being in the shape of a circular rigid strip having a width about equal to the distance between said back wall and said rear wall and having air perforations distributed along the length thereof; the combined size, shape and location of said perforations being selected to allow an essentially even air flow through said air passage,
- air guiding flanges formed along said edges of said vertical rear wall and turned toward said baking compartment,
- wherein said air diffusing ring has a polar axis perpendicular to horizontal top and bottom edges of said rectangular vertical rear wall and an equatorial axis perpendicular to vertical lateral edges of said rear wall; and wherein said air perforations are rectangular, are equally spaced around said ring, have an equal length, and have a width, along said ring, that increases from said polar axis toward said equatorial axis.

2. A baking oven as claimed in claim 1, wherein said perforations are alternately closer to one edge of said ring strip and closer to the other edge thereof.

3. A baking oven as claimed in claim 2, further comprising a steam generator, outside of said housing, said generator having a steam delivery pipe extending into said air heating-and-propulsion room above said air diffusing ring to deliver steam into said room.

4. A baking oven as claimed in claim 2, wherein said heating means comprise a plurality of heating coils disposed about and outside of said air diffusing ring.

5. A baking oven as claimed in claim 1, wherein said air guiding flanges comprise a pair of straight lateral flanges, projecting at right angle into said baking compartment from lateral edges of said rear wall, and a pair of angular flanges projecting into said baking compartment from upper and lower horizontal edges of said rear wall.

6. A baking oven as claimed in claim 5, wherein said perforations are alternately closer to one edge of said ring strip and closer to the other edge thereof.

7. A baking oven as claimed in claim 5, wherein each of said angular air guiding flanges has a horizontal wing projecting perpendicularly from the respective horizontal edge of said rear wall and a vertical wing perpendicular to said horizontal wing and projecting in a direction away from said vertical wall.

8. A baking oven as claimed in claim 7, wherein each of said horizontal wings of said angular flanges has a depth equal to about ¼ that of said straight lateral flanges.

9. A baking oven as claimed in claim 7, wherein said circumscribing walls of said housing comprise a top wall and a bottom wall, and wherein the upper horizontal edge of said rear wall stands at a distance from said top wall equal to about ¼ of the distance between the lower horizontal edge of said rear wall and said bottom wall.

10. A baking oven having a rectangular housing formed by a back wall, by circumscribing walls joining said back wall and by door means connected to said circumscribing walls at the ends thereof away from said back wall; a vertical rectangular rear wall, in said housing, positioned in spaced parallel relationship with said back wall and dividing said housing into a rear air heating-and-propelling room and a front baking compartment, said rear wall having edges terminating short of said circumscribing walls whereby to define therewith a peripheral air passage, said rear wall further having a central air suction opening; an air fan, in said room, positioned therein for drawing air through said section opening and for expelling said air into said baking compartment from across said room and air passage; and heating means about said fan, thereby to create an annulus-like hot air current in said baking compartment between said air passage and said suction opening for baking dough products in said baking compartment, the improvement in the combination therewith comprising:
- an air diffusing ring fixed in said room about said fan, said ring being in the shape of a circular rigid strip having a width about equal to the distance between said back wall and said rear wall and having air perforations distributed along the length thereof; the combined size, shape and location of said perforations being selected to allow an essentially even air flow through said air passage,
- air guiding flanges formed along said edges of said vertical rear wall and turned toward said baking compartment;
- wherein said air diffusing ring has a polar axis perpendicular to horizontal top and bottom edges of said rectangular vertical rear wall and an equatorial axis perpendicular to vertical edges of said rear wall; and wherein said air perforations are rectangular and are equal in size and have the same shape, said perforations increasing in number from said polar axis toward said equatorial axis.

11. A baking oven as claimed in claim 10, wherein said air guiding flanges comprise a pair of straight lateral flanges, projecting at right angle into said baking compartment from lateral edges of said rear wall, and a pair of angular flanges projecting into said baking compartment from upper and lower horizontal edges of said rear wall.

12. A baking oven as claimed in claim 10, wherein said perforations are alternately closer to one edge of said ring strip and closer to another edge thereof.

13. A baking oven as claimed in claim 12, further comprising a steam generator, outside of said housing, said generator having a steam delivery pipe extending into said air heating-and-propulsion room above said air diffusing ring to deliver steam into said room.

14. A baking as claimed in claim 12, wherein said heating means comprise a plurality of heating coils disposed about and outside of said air diffusing ring.

* * * * *